United States Patent
Thorbjornsson

(10) Patent No.: US 8,538,013 B2
(45) Date of Patent: Sep. 17, 2013

(54) RULES-DRIVEN HASH BUILDING

(75) Inventor: Oskar Thorbjornsson, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1448 days.

(21) Appl. No.: 11/875,117

(22) Filed: Oct. 19, 2007

(65) Prior Publication Data

US 2009/0103715 A1   Apr. 23, 2009

(51) Int. Cl.
  *H04L 9/06* (2006.01)
(52) U.S. Cl.
  USPC ............................................. 380/28; 711/216
(58) Field of Classification Search
  USPC .................. 380/28, 23, 27, 29, 30; 707/102, 707/216; 711/102, 216, 217, 218
  See application file for complete search history.

(56) References Cited

U.S. PATENT DOCUMENTS

| | | | | |
|---|---|---|---|---|
| 5,249,265 A | * | 9/1993 | Liang | 715/853 |
| 5,586,329 A | * | 12/1996 | Knudsen et al. | 717/108 |
| 5,586,330 A | * | 12/1996 | Knudsen et al. | 717/136 |
| 5,594,899 A | * | 1/1997 | Knudsen et al. | 1/1 |
| 5,596,752 A | * | 1/1997 | Knudsen et al. | 717/117 |
| 5,682,535 A | * | 10/1997 | Knudsen | 717/117 |
| 6,266,705 B1 | * | 7/2001 | Ullum et al. | 709/238 |
| 6,401,117 B1 | * | 6/2002 | Narad et al. | 709/223 |
| 6,421,730 B1 | * | 7/2002 | Narad et al. | 709/236 |
| 6,625,689 B2 | * | 9/2003 | Narad et al. | 711/110 |
| 6,654,936 B2 | * | 11/2003 | McBride | 716/112 |
| 6,701,338 B2 | * | 3/2004 | Narad et al. | 708/525 |
| 6,820,121 B1 | * | 11/2004 | Callis et al. | 709/225 |
| 6,859,841 B2 | * | 2/2005 | Narad et al. | 709/236 |
| 6,990,551 B2 | * | 1/2006 | Hum et al. | 711/3 |
| 7,031,314 B2 | * | 4/2006 | Craig et al. | 370/392 |
| 7,171,486 B2 | * | 1/2007 | Narad et al. | 709/232 |
| 7,191,433 B2 | * | 3/2007 | Narad et al. | 717/140 |
| 7,240,329 B1 | * | 7/2007 | Long et al. | 717/116 |
| 7,389,493 B1 | * | 6/2008 | Long et al. | 717/116 |
| 7,424,489 B1 | * | 9/2008 | Duffield et al. | 1/1 |
| 7,436,830 B2 | * | 10/2008 | Ben-Nun et al. | 370/389 |
| 7,565,379 B2 | * | 7/2009 | Lu et al. | 1/1 |
| 2003/0053448 A1 | * | 3/2003 | Craig et al. | 370/353 |
| 2003/0185391 A1 | | 10/2003 | Qi et al. | |
| 2005/0027963 A1 | * | 2/2005 | Hum et al. | 711/210 |
| 2006/0129463 A1 | * | 6/2006 | Zicherman | 705/26 |
| 2007/0168672 A1 | * | 7/2007 | Izu et al. | 713/176 |
| 2010/0257181 A1 | * | 10/2010 | Zhou et al. | 707/747 |

* cited by examiner

*Primary Examiner* — Ali Abyaneh
*Assistant Examiner* — Abu Sholeman
(74) *Attorney, Agent, or Firm* — Mollborn Patents, Inc.; Fredrik Mollborn

(57) ABSTRACT

Methods and apparatus, including computer program products, implementing and using techniques for generating a hash. A data store including multiple hashing tables is provided. A set of data is received on which the hash is to be based. The set of data includes one or more components. An identifier is received. The identifier identifies one or more hashing tables to use when generating the hash. The received one or more components are processed in accordance with rules defined in the identified one or more hashing tables. The processed components are combined into a final hash.

24 Claims, 3 Drawing Sheets

HASHING RULE SET

| HASH_SET_ID | HASH_RULE_SET | HASH_SET_DESC |
|---|---|---|
| 1 | USAddressHash | Hash for US addresses |

FIG. 2A

HASHES

| HASH_ID | HASH_SET_ID | ORDER | MIN_ELEM_COUNT | HASH_DESC |
|---|---|---|---|---|
| 1 | 1 | 1 | 3 | Street hash |
| 2 | 1 | 2 | 3 | PO Box hash |
| 3 | 1 | 3 | 3 | Rural route hash |

FIG. 2B

ELEMENTS

| HASH_ID | ELEM_ORDER | ELEMENT | HASHING_FUNCTIONS | MAX_LENGTH | PAD_CHARACTER | REQUIRED |
|---|---|---|---|---|---|---|
| 1 | 1 | STREET_NAME | RemoveNonAlphaNumeric, WordCrunch | 20 | " " | Y |
| 1 | 2 | BUILDING_NUM | | 10 | " " | Y |
| 1 | 3 | UNIT_NUM | | 10 | " " | N |
| 1 | 4 | POSTAL_CODE | | 3 | " " | Y |
| 2 | 1 | POB | | 20 | " " | Y |
| 2 | 2 | PO_BOX_NUM | | 20 | " " | Y |
| 2 | 3 | POSTAL_CODE | | 3 | " " | Y |
| 3 | 1 | RT | | 20 | " " | Y |
| 3 | 2 | RR_NUM | | 10 | " " | N |
| 3 | 3 | RR_BOX_NUM | | 10 | " " | N |
| 3 | 4 | POSTAL_CODE | | 3 | " " | Y |

FIG. 2C

RULES-DRIVEN HASH BUILDING

BACKGROUND

This invention relates to hashing of data. A hash function is a reproducible method of turning data into a relatively small number that can serve as a "digital fingerprint" of the data. The hash function typically substitutes and transposes the original data to create the resulting hash. Hashes have a range of different uses, for example, they are often used as indices into hash tables or hash files, or for various purposes in information security applications. Two particularly useful areas in which hashes play an important role include identity resolution applications and relationship resolution applications. Identity resolution applications attempt to answer the question "Who is who?", that is, they attempt to determine whether multiple records that appear to describe different identities are actually for a single resolved identity. Relationship resolution applications attempt to find out "Who knows who?", in order to determine potential value or danger of relationships among entities, such as customers, employees, vendors, or other entities, for example, by cross-referencing data from multiple formats from various sources.

Many of these applications use preset, hardcoded hashing algorithms. A drawback of hardcoded hashing algorithms is that they lack flexibility and rely on the data to be hashed is presented in a certain predefined format. Data that does not adhere to the predefined format can render bad or unusable hashes. One example of this is hashing of addresses. Relying on the street name as being an important part of the address hash might work well for U.S. addresses but some foreign countries, for example, Japan and Brazil, do not use street names to identify addresses. Another example is hashing of names that relies on first and last names. Not all countries and cultures follow the first and last name convention, which may cause problems when attempting to generate such a hash.

Another problem with hardcoded hashes is that when the hashes are used for finding matching entries in a data store, for example, a database, they always return the same set of matches. That is, a user can not obtain a wider or more narrow range of matches if he so desires, based on the hashes. Thus, there is a need for more flexible hashing techniques.

SUMMARY

In general, in one aspect, the invention provides methods and apparatus, including computer program products, implementing and using techniques for generating a hash. A data store including multiple hashing tables is provided. A set of data is received on which the hash is to be based. The set of data includes one or more components. An identifier is received. The identifier identifies one or more hashing tables to use when generating the hash. The received one or more components are processed in accordance with rules defined in the identified one or more hashing tables. The processed components are combined into a final hash.

The invention can be implemented to include one or more of the following advantages. The inflexibility of hard coded hashes is overcome. It is possible to redefine hashes for more accurate matching or looser matching.

The details of one or more embodiments of the invention are set forth in the accompanying drawings and the description below. Other features and advantages of the invention will be apparent from the description and drawings, and from the claims.

DESCRIPTION OF DRAWINGS

FIGS. 2A-2C show a set of hashing tables used by a hash builder to create a hash in accordance with one embodiment of the invention.

Like reference symbols in the various drawings indicate like elements.

DETAILED DESCRIPTION

Figure 1:
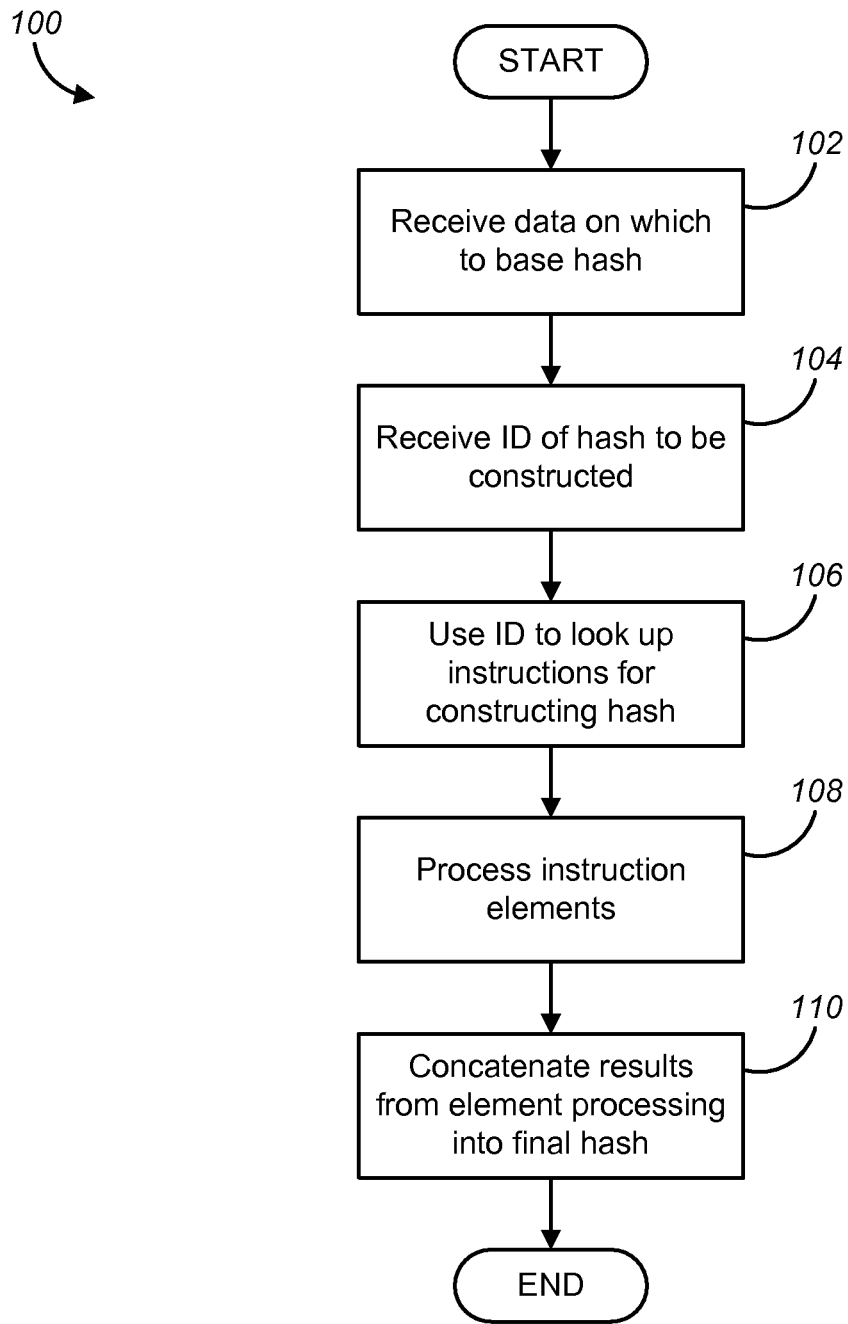
FIG. 1 shows a process for creating a hash in accordance with one embodiment of the invention.

The various embodiments of the invention stem from the realization that instead of hard coding the generation of hashes, configurable rules for hash building can be used. The rules can be grouped in to sets of rules, where the individual rules describe what data elements to use for the hash, how to process each element, and how the elements fit in the resulting hash. If a hash rule does not generate any usable hashes, a second, different rule can be applied to generate a usable hash. In the event that also this second rule does not generate a usable hash, a third rule can be applied, and so on. As a result, the inflexibility of the fixed hashes used in conventional hashing situations is overcome. Furthermore, hashes can be redefined for more accurate matching or looser matching.

FIG. 1 shows a schematic process (100) for generating a hash in accordance with one embodiment of the invention. As can be seen in FIG. 1, the process (100) starts by receiving a set of data on which the hash is to be based (step 102). Typically, the data that is received has already been pre-processed or parsed into some suitable standardized or normalized format. One example of such a standardized format is the XML (Extended Markup Language) format. It should, however, be noted that the data can also be received in a variety of other formats, such as a record set or result set in a database, for example. Next, an identifier, such as a name or identifying number, is received for the hash to be constructed (step 104).

The process (100) uses this identifier to look up instructions (i.e., the rules) in a data store for how to build the hash (step 106). The data store can be a local or remote server that is accessed through some kind of network and contains the rules in the form of files or as records in a database, or in any other conventional format as can be envisioned by those of ordinary skill in the art. The instructions in the data store are typically broken down into instruction elements. In some implementations, the identifier can be sent to a server, which, in turn, looks up different instruction elements located on one or more other servers, uses the element to build a final set of instructions, and send the final set of instructions back to the requesting party.

When the instruction elements have been identified, each instruction element takes a portion of the received data (or alternatively, a constant) and treats this data portion or constant as a string of characters. The instruction element then processes the string based on one or more predefined functions (step 108). Examples of such functions include: stripping out non-alphanumeric characters, reversing the string, sorting characters in binary sequence and upper-case, trimming the string to be of a certain length, and so on. Each instruction element can also contain additional information, such as the permissible length of the resulting string and whether the original string must contain any characters. The results from the processing of all the instruction elements are then concatenated in the sequence processed, or in some other pre-defined order, into a resulting string, which forms the hash (step 110). This ends the process (100)

As was described above, the rules can be grouped up into rule sets. If a hashing rule in the rule set does not produce a usable hash, another rule in the rule set can be used to generate the hash. One example of a situation in which such a rule set may be useful is as follow. Assume that an address hash is to be constructed based on a first rule using a street name along with other parts of the address. However, if a PO Box address is received, the PO Box address typically does not include any street name as part of the address data. Thus, if the street name is required, no acceptable hash can be built using the first rule. In this case the PO Box address data could be passed to a second hashing rule in the rule set, which is capable of processing PO Box data.

An embodiment of the invention will now be described in further detail, by way of example of a hash builder that references a database to create a hash based on a physical address. The hash builder can be implemented as a software application that controls the generation of the hash in a manner similar to what was described above with reference to FIG. 1. In this embodiment, the hash builder reads its configuration data from a database. The configuration is split between three tables, which are illustrated in FIGS. 2A-2C. The first of these tables, the HASHING_RULE_SET table, shown in FIG. 2A, contains information about what set of hashes go together. For example, US address hashes belong together, irrespective of the type of address, as will be explained in further detail below.

The second table, the HASHES table shown in FIG. 2B contains information about the hashes grouped by hash sets. In the HASHES table, the HASH_SET_ID column represents a foreign key from the HASHING_RULE_SET table of FIG. 2A; the ORDER column indicates the order in which the hashes are processed; the MIN_ELEM_COUNT column contains the minimum number of elements required to construct a useful hash; and the HASH_DESC column is a human-readable description of the hash.

Finally, the third table, the ELEMENTS table shown in FIG. 2C contains more detailed information on how the hash is generated. In the ELEMENTS table, the HASH_ID column contains foreign keys to the HASHES table of FIG. 2B; the ELEM_ORDER column contains the sequence in which the element is processed; the ELEMENT column contains XPATH locations of the data elements; the HASHING_FUNCTIONS column is a comma delimited list of functions being performed on the element; the MAX_LENGTH column contains the maximum length of the processed element; the PAD_CHARACTER column indicates a padding character, if desired; and the REQUIRED column details whether the element must contain data for a valid hash to be generated.

These tables can be used as follows. Assume that the following address is received to be processed into a hash:
 123 Main St.
 Las Vegas, NV 89101
 This address gets parsed into following parts:
 Street name: Main
 Street suffix: St.
 Street number: 123
 City: Las Vegas
 State: NV
 Zip: 89101
The first rule of the USAddressHash rule set, i.e. Street hash, is executed. The first element is processed by executing two functions on the first element. The first function, "RemoveNonAlphaNumeric," removes any non-alphanumeric characters from the string. The string "Main" contains alphanumeric characters only, so the string is left unchanged.

The second function "CrunchWord" removes the second consonants of all double consonants and removes all vowels except the first vowel. This causes the string "Main" to be changed into "Man". The resulting string is then padded at the end with spaces in order to produce a string having 20 characters.

Next, the street number (or building number) is processed. No functions are executed on the street number, but the street number gets padded with spaces in order to produce a string having a length of 10 characters. It should be noted that if the string is longer than 10 characters before padding, the string will be truncated down to 10 characters. This string is then concatenated to the end of the string resulting from the first element.

The third element is the unit number. However, in this scenario, the address being processed does not contain a unit number. Therefore, a string of 10 spaces is created and attached to the end of the concatenated string that was generated by element 2.

The last element for this hash rule is zip or postal code. Again no functions are executed, but the max length of the string is 3 so the string gets truncated to "891". Again, this string is attached to the end of the concatenated string. This produces the final hash:
 Man.......123.................891
In the above hash, dots (.) have been entered where the spaces would be, in order to visualize the number of spaces and to improve the understanding of the described embodiment. This renders a valid hash, since the required elements are present, that is, the street name, the building number and the postal code. The minimum element count, which is 3, is also met.

Now consider, a different example with a different type of an address:
 RR 1 Box 12
 Las Vegas, NV 89111
 This address gets parsed into:
 Rural route number: 1
 Rural route box number: 12
 City: Las Vegas
 Zip: 89111
When the first element of the Street hash rule gets processed, the element requires a street name. Thus, a valid hash cannot be constructed using that rule. The second rule, PO box hash, requires a second element which is a PO Box number. Since this is also missing, a valid PO box hash cannot be constructed. In the third hash rule, Rural route hash, the first element is a literal of "RT" which is then padded with spaces to produce a string of 20 characters.

The second element takes the rural route number and pads the route number with spaces in order to produce a string with 10 characters, which is subsequently appended to the string from the first element.

The third element, rural route box number, is also padded with spaces to yield a 20 character string, which is also appended to the resulting string from elements 1 and 2.

The last element the zip or postal code is truncated to 3 characters and attached to the resulting string. This gives:
 RT..................1.........12.........891
Again, dots (.) have been entered where the spaces would be, in order to make the spaces visible and to ease the understanding of the described embodiment. This is a valid hash as all required elements are present and the required minimum count of 3 is also fulfilled.

In some embodiments, an additional step can be performed after the hash creation, which makes the process suitable for anonymous resolution. In this additional step, the resulting hash is hashed again with a cryptographic, one-way hashing algorithm, such as the MD5 or SHA-0 algorithms, which are well known to those of ordinary skill in the art. This makes it possible to match data securely without disclosing the source data.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, the above examples have used address data as a basis for generating the hash. However, any type of numerical or alphabetical information can be used, such as names, ID numbers, telephone numbers, and so on. Other types of characteristic or biometric information for an individual can also be used, such as, height, eye color, fingerprint information, a person's name, place of birth, and so on. Accordingly, other embodiments are within the scope of the following claims.

The invention claimed is:

1. A computer-implemented method for generating a hash, based on configurable hashing rules stored in two or more hashing tables of a computer system, the method comprising:
providing a data store including multiple hashing tables;
receiving a set of data on which the hash is to be based, the set of data including one or more components;
receiving an identifier identifying two or more hashing tables to use when generating the hash;
processing the received one or more components in accordance with rules defined in the identified two or more hashing tables; and
combining the processed components into a final hash.

2. The method of claim 1, wherein the data store is a server and the hashing tables are embodied in the server as one of: a set of files and a set of objects in a database.

3. The method of claim 1, wherein the data store is a distributed data store that includes two or more servers and different hashing tables among the multiple hashing tables are stored on each of the two or more servers.

4. The method of claim 1, wherein the set of data is a pre-parsed set of data.

5. The method of claim 1, wherein the set of data is received in an Extensible Markup Language Format.

6. The method of claim 1, wherein the set of data includes data describing a geographical street address.

7. The method of claim 1, wherein each rule includes one or more elements and each element is operable to process one component in the received set of data.

8. The method of claim 1, wherein processing includes one or more of: removing non-alphanumeric characters from a received component, reversing the order of characters in a received component, sorting characters of a received component in a binary sequence, and trimming a received component to have a particular size.

9. The method of claim 1, wherein combining the processed components into a final hash includes concatenating the processed components into a hash string.

10. The method of claim 1, further comprising:
processing the received one or more components in accordance with one or more contingent rules in the event that the one or more rules specified by the identifier fail to generate a final hash.

11. The method of claim 1, further comprising:
processing the final hash with a cryptographic one-way hashing algorithm.

12. The method of claim 11, wherein the hashing algorithm is one of: an MD5 algorithm and a SHA-0 algorithm.

13. A computer program product comprising a computer useable non-transitory storage medium including a computer readable program for generating a hash, based on configurable hashing rules stored in two or more hashing tables of a computer system, wherein the computer readable program when executed on a computer causes the computer to:
provide a data store including multiple hashing tables;
receive a set of data on which the hash is to be based, the set of data including one or more components;
receive an identifier identifying two or more hashing tables to use when generating a hash;
process the received one or more components in accordance with rules defined in the identified two or more hashing tables; and
combine the processed components into a final hash.

14. The computer program product of claim 13, wherein the data store is a server and the hashing tables are embodied in the server as one of: a set of files and a set of objects in a database.

15. The computer program product of claim 13, wherein the data store is a distributed data store that includes two or more servers and different hashing tables among the multiple hashing tables are stored on each of the two or more servers.

16. The computer program product of claim 13, wherein the set of data is a pre-parsed set of data.

17. The computer program product of claim 13, wherein the set of data is received in an Extensible Markup Language Format.

18. The computer program product of claim 13, wherein the set of data includes data describing a geographical street address.

19. The computer program product of claim 13, wherein each rule includes one or more elements and each element is operable to process one component in the received set of data.

20. The computer program product of claim 13, wherein processing includes one or more of: removing non-alphanumeric characters from a received component, reversing the order of characters in a received component, sorting characters of a received component in a binary sequence, and trimming a received component to have a particular size.

21. The computer program product of claim 13, wherein combining the processed components into a final hash includes concatenating the processed components into a hash string.

22. The computer program product of claim 13, further causing the computer to:
  process the received one or more components in accordance with one or more contingent rules in the event that the one or more rules specified by the identifier fail to generate a final hash.

23. The computer program product of claim 13, further causing the computer to:
  process the final hash with a cryptographic one-way hashing algorithm.

24. The computer program product of claim 23, wherein the hashing algorithm is one of: an MD5 algorithm and a SHA-0 algorithm.

* * * * *